2,883,365

SULFUR VULCANIZABLE RUBBER AND 1,1-BIS(4-HYDROXY PHENYL)CYCLOALKANE

Roger A. Mathes, Akron, Ohio, assignor to The B. F. Goodrich Company, New York, N.Y., a corporation of New York No Drawing. Application March 1, 1955
Serial No. 491,524

16 Claims. (Cl. 260—45.95)

This invention relates to non-staining, non-discoloring deterioration retarders and to rubber compositions containing the same, and more particularly to a new class of alkylated bis-phenol ketanes which are highly effective deterioration retarders and which possess excellent non-discoloring and non-staining properties when used in light-colored or white rubber products.

In the commercial manufacture of vulcanized rubber products, it is necessary to include in the formulation compounds which render the vulcanized rubber products resistant to deterioration by the action of oxygen, otherwise vulcanized rubber products develop altered and undesirable properties after exposure to oxygen over a period of time. The rate of deterioration is dependent upon the oxygen content of the atmosphere in which such products are exposed, the temperature, the pressure, the presence of sunlight, and the like.

It has previously been the practice in the manufacture of rubber produces to add to the rubber composition before vulcanization antioxidants of the diarylamine and like types. However, these antioxidants, while effective, unfortunately stain and discolor light-colored rubber compositions, particularly on exposure to sunlight, and hence are not suitable for use in light-colored and white vulcanized rubber products.

It has heretofore been proposed to utilize various phenolic compounds as deterioration retarders for light-colored rubber products. While some of these do have the desirable property of not causing serious discoloration on exposure to sunlight, their antioxidant activity is relatively weak, as compared with the diarylamine antioxidants in general use.

There is consequently a need for a suitable deterioration retarder for inclusion in rubber formulations, from which white and light-colored vulcanized rubber products are made, of compounds capable of protecting the vulcanized rubber product from deterioration in the presence of oxygen and at the same time not to produce undesirable discoloration as such a rubber product ages in light. It is to a new class of chemical reaction products which have both of these desirable properties that this application is directed.

The term "rubber" is employed in this application in its broad generic sense to include all natural and synthetic unsaturated rubbery polymeric materials. The term "sulfur-vulcanizable rubbery diolefinic polymer" is employed in this application in a broad generic sense to include the various natural crude rubbers, which are regarded as naturally-occurring isoprene polymers, and such synthetic rubbers as polymers of conjugated dienes, such as butadiene-1,3, isoprene, piperylene, 2,3-dimethylbutadiene-1,3, and other butadiene-1,3 hydrocarbons, chloroprene, cyano butadiene-1,3, etc., as well as copolymers of these conjugated dienes with each other and copolymers of these conjugated dienes with other unsaturated chemical compounds copolymerizable therewith, such as styrene, chlorostyrene, isobutylene, acrylonitrile, methacrylonitrile, acrylic and methacrylic acids, alkyl acrylates and methacrylates, vinylidene chloride, vinyl pyridine, etc.

I have discovered that a new class of chemical compounds, herein designated "alkylated bis-phenol cycloalkanes," possess superior properties as non-staining, non-discoloring deterioration retarders in light-colored and white rubber products. These new deterioration retarders are of the general formula

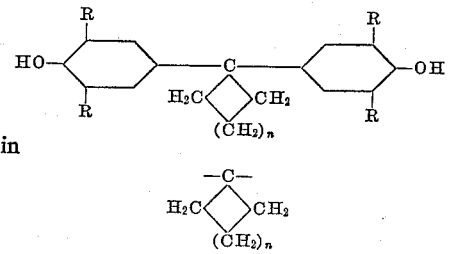

wherein

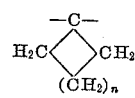

is a saturated cyclic hydrocarbon group, in which $n$ is an integer ranging from 1 to 9, and R is a monovalent substituent selected from a class consisting of a hydrogen atom an alkyl radical and an aralkyl radical, the radical in either case having from 4 to 10 carbon atoms, with from one to four of the R's each representing either an alkyl or an aralkyl radical, and each such radical being attached to a carbon atom of a phenyl group in a position ortho to a carbon to which a hydroxyl group is attached. The term "alkylating radical" is herein for convenience employed in a generic sense to designate either an alkyl or an aralkyl radical.

The deterioration retarders which have been found effective for the purposes of this invention are the reaction products of unsaturated hydrocarbons and bis-phenol cycloalkanes. In such a reaction, one to four alkylating radicals are added to the phenyl groups of the bis-phenol cycloalkane, each in ortho position to a hydroxyl group. The tetra-alkylated bis-phenol saturated cyclic ketanes are highly effective as non-staining, non-discoloring deterioration retarders, but the lower alkylated reaction products, such as the mono- and di-alkylated products, are also effective.

Among the unsaturated hydrocarbons found to yield excellent deterioration retarders are the monoolefinic hydrocarbons, isobutylene and styrene. However, other monoolefinic hydrocarbons containing 4 to 10 carbon atoms have been found to be effective, including normal olefins such as n-butylene, pentene-1 and the like, and especially isoolefins such as isoamylene, 2-methyl pentene-1, 2-ethyl pentene-1, 2-ethyl propene-1, 2-methyl hexene-1, diisobutylene and other similar alkenyl hydrocarbons, as well as aralkyl olefins, such as styrene, alpha-methyl styrene, para-methyl styrene, para-methyl alpha-methyl styrene, ethyl styrene and other similar aryl-substituted alkenyl hydrocarbons, as well as limonene, camphene and the like. Mixtures of these alkylating agents may also be employed. Among the bis-phenol cycloalkanes which have been found to be effective are 1,1-bis-(4-hydroxy phenyl) cyclohexane, 1,1-bis(4-hydroxy phenyl)cyclopentane, 1,1-bis(4-hydroxy phenyl)cycloheptane, 1,1-bis(4-hydroxy phenyl)cyclooctane, 1,1-bis(4-hydroxy phenyl)cyclodecane, and the like.

The reactants preferably employed in the production of the non-staining, non-discoloring deterioration retarders of this invention are (1) 1,1-bis(4-hydroxy phenyl)-cyclohexane and isobutylene, and (2) 1,1-bis(4-hydroxy phenyl)cyclohexane and styrene, although other similar reactants produce satisfactory non-staining, non-discoloring deterioration retarders.

The preparation of the bis-phenol cycloalkanes is not claimed as a part of the invention of this application. In passing, it is observed that phenol and the saturated cyclic ketones condense readily on being brought into intimate contact one with the other in the presence of a condensation catalyst. Thus, phenol and cyclohexanone readily condense to form 1,1-bis(4-hydroxy phenyl)cyclohexane and water.

The alkylating reaction is preferably conducted in the presence of an organic solvent inert to the reactants. Such hydrocarbon solvents as hexane, heptane, benzene, toluene and the like are satisfactory. Other usual solvents such as hydrochloric and acetic acids may be employed. The temperature of the reaction is not critical, but the reaction is preferably carried out at above 50° C. Temperatures up to the boiling points of the solvents may be employed, while pressure reactions may be conducted with low boiling solvents.

Acidic condensation catalysts are normally employed, such as sulfuric acid, para-toluene sulfonic acid, boron trifluoride, boron trifluoride etherate, as well as other acid catalysts, such as zinc chloride, ferric chloride, aluminum chloride, hydrogen chloride, phosphoric acid and like acid condensation catalysts. The acid catalyst should preferably have a pH between 1 and 6. The amount of such acid catalysts required for the alkylating reaction may be varied quite widely, but is generally from 0.1 to about 5 percent by weight of the bis-phenol ketane reactant, or from about 0.5 to 10 percent by weight of reactants.

In commercial operations, the use as a catalyst of a finely-divided acid activated clay is particularly advantageous since the reacted mixture has only to be filtered and the solvent removed to make it ready for use, and since the acid activated clay carries with it many colored or otherwise undesirable reaction by-products. The acid activated clays preferred are those whose major component is aluminum silicate in an amount preferably greater than 50 percent. The clay should preferably be of such a particle size that more than 90 percent of the particles will pass a 325 mesh screen and have a particle size of less than 0.05 millimeter. The acid activated clay should also preferably have an acid reaction with a pH between 1 and 6. Such an acid activated clay is marketed under the trade name "Retrol." The amount of acid activated clay catalyst may be varied widely, and generally ranges from 0.5 to 10 percent or more of the weight of the reactants.

The amounts of the bis-phenol cycloalkane and the alkylating monoolefinic hydrocarbon may also be varied. Preferably at least 4 mols of the alkylating hydrocarbon to 1 mol of the bis-phenol cycloalkane should be employed. Generally, an excess of the alkylating hydrocarbon is employed, the amount of the excess being dependent on the nature of the alkylating hydrocarbon and its tendency to side reactions. The 4:1 ratio of the reactants, under optimum reaction conditions, results in a high yield of tetra-alkylated bis-phenol cycloalkane although in actual practice an excess of the alkylating hydrocarbon is normally employed. Thus, 5 mols of alkylating hydrocarbon react with 1 mol of bis-phenol cycloalkane to form a mixture of reaction products, comprising mainly the tetra-alkylated bis-phenol cycloalkane, with minor proportions of the lower di-alkylated and mono-alkylated bis-phenol cycloalkanes. The tetra-alkylated reaction product is the most effective as an antioxidant. Hence, the reaction is preferably carried out under optimum reacting conditions to yield a maximum amount of the tetra-alkylated bis-phenol cycloalkane. The tetra-alkylated reaction product may be separated from the reaction mixture and employed as a deterioration retarder. However, for reasons of economy, the reaction mixture comprising in the main the tetra-alkylated reaction product is commonly used as the non-staining, non-discoloring deterioration retarder.

The alkylating reaction may be carried out in a reaction vessel equipped with a stirrer, heater, a reflux condenser and an inlet tube for introducing the alkylating hydrocarbons, preferably although not necessarily in a gaseous state, into the bottom of the reactor. In one method of conducting the alkylating reaction, a solvent such as benzene is placed in the reactor and the bis-phenol cycloalkane and acidic catalyst added thereto; the mixture is stirred vigorously, and to hasten the reaction may be heated moderately, say to around 50° C. to 70° C., preferably under an inert atmosphere such as nitrogen; the alkylating hydrocarbon is then added slowly over a period of several hours, the slow addition being conducive to a higher yield of the tetra-alkylated reaction product. At the end of the reaction, if acid activated clay is employed as a catalyst, the reaction mixture is filtered to remove the clay. If other acid catalysts are used, the reaction mixture is neutralized with an alkali and washed thoroughly with water, the two layers which form on standing are separated. In either case, benzene is then stripped under reduced pressure from the liquid medium containing the reaction products. The resulting reaction products may be used in the form recovered from the solvent, which is an admixture of the alkylated bis-phenol cycloalkanes, or the tetra-alkylated bis-phenol ketane may be separated from the reaction mixture, as by fractional distillation, and used separately.

The amount of the alkylated bis-phenol cycloalkanes which may be employed as a deterioration retarder in rubber ranges from about 0.1 to about 10 weight percent based on the rubber, whereas to obtain a maximum value of the alkylated bis-phenol cycloalkanes as a non-discoloring, non-staining deterioration retarder, an amount ranging from about 0.5 to 5 weight percent will generally give adequate protection. Commonly, 1 weight percent on the rubber is employed.

The non-staining, non-discoloring deterioration retarders of this application can be readily admixed with rubber and rubber compositions at any stage prior to vulcanization thereof to form rubber articles. For example, they may be admixed into rubber and rubber compositions at the same time and in the same manner that vulcanizing, accelerating and other compounding ingredients are added, which is a preferred way for incorporating non-staining, non-discoloring deterioration retarders into natural crude rubber and results in the deterioration retarders being uniformly dispersed throughout the rubber composition. In the case of synthetic rubbers, which are ordinarily prepared by polymerization in an aqueous medium, it is advantageous to add the deterioration retarder in an aqueous dispersion or emulsion to the synthetic rubber latex as it comes from the polymerizer. In this way, when the synthetic rubber is recovered from the latex by coagulation, the non-staining, non-discoloring deterioration retarder is already uniformly distributed throughout the mass of the synthetic rubber, so that the rubber is protected against deterioration from the time it is made until it is compounded for use. This makes it unnecessary to add an antioxidant during the compounding of the rubber, although more of the non-staining, non-discoloring deterioration retarder can be added with the other compounding ingredients to insure added protection in the event any specific rubber composition may indicate such a course to be desirable.

The preparation of the alkylated bis-phenol cycloalkanes and compositions of the same in rubber compositions is more fully set forth in the following examples which are to be understood to be illustrative only since numerous modifications and variations thereof will be apparent to those skilled in the art.

EXAMPLE I

A reaction vessel is equipped with a thermometer, an agitator, a reflux condenser and an inlet tube for introducing the alkylating olefin at the bottom of the vessel. About 40 grams (0.15 mol) of 1,1-bis(4-hydroxy phenyl)cyclohexane is intimately admixed with, and suspended in, 250 cc. of benzene and about 2 grams of boron trifluoride etherate catalyst. This mixture may be made within the reactor. It is vigorously agitated in the reaction vessel and heated somewhat, the temperature not being critical. About 42 grams (0.75 mol) of isobutylene is slowly added through the inlet tube over a period of three hours with constant agitation while preferably maintaining the reaction temperature at around 50° C. to 70° C., time being given for the isobutylene to alkylate the 1,1-bis(4-hydroxy phenyl)cyclohexane. The benzene solution of the reaction product is washed with a 10% sodium carbonate water solution, followed by a washing with brine. By distillation under reduced pressure, the benzene and excess isobutylene are removed from the washed solution yielding 65.5 grams of a yellow, viscous syrup. Triisobutylene is also given off during the distillation indicating that some polymerization of the isobutylene has also taken place. A small amount of the triisobutylene in the reaction mixture is advantageous since it acts as an anti-crystallization substance and thus prevents any tendency of the reaction mixture to crystallize during extended periods of storage.

The yellow, viscous syrup thus obtained has as its major constituent the tetra-tertiary butylated bis-phenol cyclohexane, namely; 1,1-bis(3,5 - di-t-butyl-4 - hydroxy phenyl)cyclohexane. Other definitely identifiable reaction products are the mono- and di-tertiary butylated bis-phenol cyclohexanes, the alkylating radicals being in each case attached to a carbon atom of the phenyl group in a position ortho to the carbon to which the hydroxyl group is attached.

*Evaluation of antioxidant activity*

The reaction product of Example I is evaluated for its efficiency as an antioxidant by incorporating it in a standard natural rubber test recipe and curing in a steam press. The recipe employed is:

| Ingredients— | Parts by weight |
|---|---|
| Natural rubber | 100.0 |
| Easy processing channel black | 50.0 |
| Zinc oxide | 5.0 |
| Stearic acid | 3.0 |
| Sulfur | 3.0 |
| Accelerator (benzothiazyl disulfide) | 1.0 |
| Reaction product, Example I | 1.0 |

A blank without deterioration retarder, but otherwise the same as in the above recipe, and a control having 1 part of phenyl-β-naphthylamine replacing the 1 part reaction product of Example I, are also compounded and cured for comparison purposes. Each of the compounded stocks is cured in a steam press at 280° F. for 60 and 80 minutes.

The aging tests follow the standard ASTM procedure (D865–48T). Test dumbbell strips are cut from the vulcanized stock and aged in open test tubes for 24 and 48 hours at 212° F. Flexing tests are made in a De Mattia flexing machine which records the number of flexures. The following test results were obtained:

TABLE I.—TENSILE AND FLEX-LIFE OF REACTION PRODUCT OF EXAMPLE I

| | Percentage of Original Tensile Strength Retained After Aging at 212° F. | | | | Flex-Life to Failure | Flex-Life Improvement Over Blank |
|---|---|---|---|---|---|---|
| | 24 Hours' Aging | | 48 Hours' Aging | | | |
| | 60" Cure | 80" Cure | 60" Cure | 80" Cure | | |
| Reaction Product, Example I | 81 | 79 | 70 | 58 | 145,000 | 4.1 |
| Blank—No Antioxidant | 61 | 49 | 33 | 29 | 35,000 | 1.0 |
| Control—Phenyl-beta-naphthylamine | 81 | 78 | 60 | 56 | 143,000 | 4.1 |

The deterioration retarding properties of the reaction product of Example I are equal or superior to those of phenyl-β-naphthylamine, the most widely used antioxidant.

*Evaluation of discoloration and staining*

The reaction product of Example I is tested for discoloration and staining tendencies by incorporating in a standard tire white wall rubber stock and curing in a steam press. The recipe employed is:

| Ingredient— | Parts by weight |
|---|---|
| Natural rubber | 100.0 |
| Zinc oxide | 85.0 |
| Titanium dioxide | 15.0 |
| Ultramarine blue | 0.2 |
| Stearic acid | 1.0 |
| Hepteen base | 0.3 |
| Sulfur | 3.0 |
| Reaction product—Example I | 1.0 |

For comparison, a blank without antioxidant and a control stock containing phenyl-β-naphthylamine in place of the reaction product of Example I are similarly compounded and given a like cure. The cured stocks are exposed to a standard RS sunlamp at a distance of 8 inches for 24 hours to determine the discoloration of the stock. In the table below, the greater the numerical value, the greater the discoloration.

TABLE II.—DISCOLORATION OF REACTION PRODUCT OF EXAMPLE I

| | |
|---|---|
| Reaction product—Example I | 2 |
| Blank | 2 |
| Control—phenyl-β-naphthylamine | 8 |

This shows that stock with the reaction product of Example I does not discolor any more than the stock without any antioxidant and that the standard control stock with phenyl-beta-naphthylamine discolors much more than either of the other stocks.

The reaction product of Example I is tested for staining by taking vulcanized test pieces of the cured white stock identified above and placing them between white lacquered and white enameled refrigerator panels for 96 hours at 80° C. at a constant contact pressure of 1 pound per square inch. In the table below, the larger the numerical value of the fractional rating, the greater the stain:

TABLE III.—STAINING OF REACTION PRODUCT OF EXAMPLE I

| | |
|---|---|
| Reaction product of Example I | 1/8 |
| Blank | 2/8 |
| Control—phenyl-β-naphthylamine | 4/8 |

The lower fractional rating of staining in the stock containing the reaction product of Example I clearly shows the superiority of the reaction product over the blank and the standard control antioxidant phenyl-β-naphthylamine.

EXAMPLE II

A reaction vessel is equipped with a thermometer, an agitator, a reflux condenser and inlet tube for introducing the alkylating olefin at the bottom of the vessel. About 53.6 grams of 1,1-bis(4-hydroxy phenyl)cyclohexane is intimately admixed with, and suspended in, 300 cc. of benzene and 6 grams of 50% sulfuric acid catalyst, the admixture being preferably made in the reactor. About 62.4 grams of styrene are slowly added through the inlet tube over a period of two hours with constant stirring while maintaining the reaction mixture at a temperature to cause a continuous refluxing of the benzene, time being given for the styrene to alkylate the 1,1-bis(4-hydroxy phenyl)cyclohexane. The reaction mixture comprises a benzene solution of the styrenated 1,1-bis(4-hydroxy phenyl) cyclohexane, which is washed with a 10% water solution of sodium carbonate, followed by a wash with brine. By distillation of the resulting benzene solution under reduced pressure, the benzene and any excess styrene are removed, yielding 121 grams of a viscous yellow syrup.

The yellow, viscous syrup thus obtained comprises mainly the tetra-styrenated bis-phenol cyclohexane, namely, 1,1-bis(3,5-di-α-phenylethyl-4-hydroxy phenyl) cyclohexane, the alkylating radicals being attached to carbon atoms of the bis-phenol phenyl groups in positions ortho to the carbons to which the hydroxyl groups are attached.

Both the whole reaction product and the tetra-styrenated bis-phenol cyclohexane, when tested for tensile strength, flex-life, staining and discoloring properties in the manner described in connection with Example I, are the equal of or superior to phenyl-beta-naphthylamine with respect to imparting aging and flex-life to rubber stocks and are of a much superior non-discoloring and non-staining deterioration retarder.

EXAMPLE III

It has been noted above that more than one alkylating olefin may be employed to produce the non-discoloring, non-staining antioxidant of this application. As an illustration of such a reaction product, a reaction vessel equipped as described in Example I and containing about 350 cc. of benzene is charged with about 107 grams (0.4 mol) of 1,1-bis(4-hydroxy phenyl)cyclohexane and 10 grams of a finely-divided acid clay of the type above described which has a pH of about 3. This mixture is vigorously stirred while heating to about 50° to 70° C., and nitrogen is introduced at a slow rate to displace the air over the liquid contents of the vessel. There is then added gradually about 21 grams (0.2 mol) of styrene over a period of 30 minutes followed by the gradual introduction of about 101 grams (1.8 mols) of isobutylene over a period of 3 hours. The hot reaction mixture is filtered to remove the clay and other solids, and the benzene is distilled from the reaction product under reduced pressure, as in Example I. The resulting reaction product is a yellow, viscous material, which, when tested in rubber in the manner described in Example I, is found to impart to vulcanized rubber products excellent aging properties, flex-life and outstanding non-discoloring, non-staining properties, of the order indicated for the reaction product of Example I.

The preparation of the alkylated bis-phenol cycloalkanes of this invention may be carried out using other acid catalysts, this invention being in nowise limited to any specific acid catalysts, and also may be carried out using other unsaturated hydrocarbons, such as are enumerated in a preceding portion of this specification. Likewise, other bis-phenol cycloalkanes of the type described herein may be employed in place of the 1,1-bis(4-hydroxy phenyl)cyclohexane recited in the specific examples. When any of these alkylated bis-phenol cycloalkanes are employed in rubber compounds, whether natural rubber or synthetic rubber compounds, similar excellent results are obtained in the protection of both unvulcanized and vulcanized rubber compositions. Rubber vulcanizates embodying deterioration retarders of this invention have outstanding properties in aging life, flex-life and in non-discoloring, non-staining properties, characteristics which are highly important in white and light-colored stocks such as are employed in refrigerator gaskets, white sidewall tires, light-colored gloves, bathing caps, tubing and similar articles.

It is to be understood that the invention of this application is not limited to the specific disclosure or to the specific examples, which have been offered merely as illustrations, modifications in the proportions and types of materials employed may be varied and equivalent materials, as defined in the specification, may be employed where desirable, without departing from the spirit and scope of the invention as defined in the appended claims.

What is claimed is:

1. A composition comprising a sulfur-vulcanizable rubbery diolefinic polymer throughout which is dispersed from about 0.1 to about 5.0 weight percent of a non-staining, non-discoloring deterioration retarder for said polymer comprising a reaction product of a 1,1-bis(4-hydroxy phenyl)cycloalkane, the cycloalkane group having from 4 to 12 carbon atoms, and monoolefinic alkylating hydrocarbons selected from the class consisting of alkylene and aralkylene hydrocarbons having from 4 to 10 carbon atoms, which reaction product consists essentially of alkylated 1,1-bis(4-hydroxy phenyl)cycloalkanes having the alkylating radicals each having from 4 to 10 carbon atoms and being attached to a carbon atom of a phenyl group in a position ortho to a carbon atom to which a hydroxyl group is attached.

2. The composition defined in claim 1 in which the deterioration retarder comprises a 1,1-bis(3,5-di-alkyl-4-hydroxy phenyl)cycloalkane.

3. The composition defined in claim 1 in which the deterioration retarder comprises a 1,1-bis(3,5-di-aralkyl-4-hydroxy phenyl)cycloalkane.

4. The composition defined in claim 1 in which the deterioration retarder comprises a 1,1-bis(3,5-di-t-butyl-4-hydroxy phenyl)cyclohexane.

5. The composition defined in claim 1 in which the deterioration retarder comprises a 1,1-bis(3,5-di-alpha-phenylethyl-4-hydroxy phenyl)cyclohexane.

6. A composition comprising a sulfur-vulcanizable rubbery dicelfinic polymer throughout which is dispersed from about 0.1 to about 5.0 weight percent of a non-staining, non-discoloring deterioration retarder for said polymer comprising a reaction product of a 1,1-bis(4-hydroxy phenyl)cycloalkane, the cycloalkane group having from 4 to 12 carbon atoms, and two monoolefinic alkylating hydrocarbons, selected from the class consisting of alkylene and aralkylene hydrocarbons and each having from 4 to 10 carbon atoms, which reaction product consists essentially of 1,1-bis(3,5-di-alkylated-4-hydroxy phenyl)cycloalkanes.

7. The composition defined in claim 6 in which one of the two monoolefinic alkylating hydrocarbons is an alkylene hydrocarbon and the other an aralkylene hydrocarbon.

8. The composition defined in claim 6 in which one of the two monoolefinic alkylating hydrocarbons is isobutylene and the other is styrene.

9. A sulfur-vulcanized rubbery composition comprising a sulfur-vulcanized rubbery diolefinic polymer having excellent non-staining, non-discoloring antioxidant properties, which composition has dispersed therethrough from about 0.1 to 5.0 weight percent of a non-staining, non-discoloring deterioration retarder for said polymer comprising a reaction product of a 1,1-bis(4-hydroxy phenyl)cycloalkane, the cycloalkane group having from 4 to 12 carbon atoms, and monoolefinic alkylating hydrocarbons selected from the class consisting of alkylene and aralkylene hydrocarbons having from 4 to 10 carbon atoms, which reaction product consists essentially of 3,5-alkylated 1,1-bis(4-hydroxy phenyl)cycloalkanes having 4 alkylating radicals each of which is attached to a carbon atom of a phenyl group in a position ortho to a carbon atom to which a hydroxyl group is attached, the sulfur-vulcanized unsaturated rubbery polymer composition having dispersed therethrough the said deterioration retarder.

10. The sulfur-vulcanized composition defined in claim 9 in which the deterioration retarder comprises a 1,1-bis-(3,5-di-alkyl-4-hydroxy phenyl)cycloalkane.

11. The sulfur-vulcanized composition defined in claim 9 in which the deterioration retarder comprises a 1,1-bis-(3,5-di-aralkyl-4-hydroxy phenyl)cycloalkane.

12. The sulfur-vulcanized composition defined in claim 9 in which the deterioration retarder comprises a 1,1-bis-(3,5-di-t-butyl-4-hydroxy phenyl)cyclohexane.

13. The sulfur-vulcanized composition defined in claim 9 in which the deterioration retarder comprises a 1,1-bis-(3,5-di-alpha-phenylethyl-4-hydroxy phenyl)cyclohexane.

14. A sulfur-vulcanized rubbery composition comprising a sulfur-vulcanized rubbery diolefinic polymer having excellent non-staining, non-discoloring antioxidant properties, which composition has dispersed therethrough from about 0.1 to 5.0 weight percent of a non-staining, non-discoloring deterioration retarder for said polymer comprising a reaction product of a 1,1-bis(4-hydroxy phenyl)-cycloalkane, the cycloalkane group having from 4 to 12 carbon atoms, and two monoolefinic alkylating hydrocarbons selected from a class consisting of alkylene and aralkylene hydrocarbons and each having from 4 to 10 carbon atoms, which reaction product consists essentially of 3,5-alkylated 1,1-bis(4-hydroxy phenyl)cycloalkanes having 4 alkylating radicals each of which is attached to a carbon atom of a phenyl group in a position ortho to a carbon atom to which a hydroxyl group is attached, the sulfur-vulcanized unsaturated rubbery polymer composition having dispersed therethrough the said deterioration retarder.

15. The sulfur-vulcanized composition defined in claim 14 in which one of two monoolefinic alkylating hydrocarbons is an alkylene hydrocarbon and the other an aralkylene hydrocarbon.

16. The sulfur-vulcanized composition defined in claim 14 in which one of the two monoolefinic alkylating hydrocarbons is isobutylene and the other is styrene.

References Cited in the file of this patent

UNITED STATES PATENTS

| | | |
|---|---|---|
| 2,602,822 | Schwarzer et al. | July 8, 1952 |
| 2,628,953 | Newby | Feb. 17, 1953 |
| 2,636,905 | Kehe et al. | Apr. 28, 1953 |
| 2,647,102 | Ambelang | July 28, 1953 |

FOREIGN PATENTS

| | | |
|---|---|---|
| 63,381 | Holland | June 15, 1949 |

OTHER REFERENCES

Kitchen et al.; Ind. and Eng. Chem., vol. 42, pages 675–685, 1950.

Morawetz: Ind. and Eng. Chem., vol. 41, pages 1442–1447, July 1949. (Copy in Scientific Library.)